US012574183B2

(12) United States Patent
Li

(10) Patent No.: US 12,574,183 B2
(45) Date of Patent: Mar. 10, 2026

(54) METHOD FOR INDICATING OR DETERMINING TRANSMISSION CONFIGURATION INDICATION STATES, AND DEVICE, AND COMPUTER STORAGE MEDIUM

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 660 days.

(21) Appl. No.: 17/800,300

(22) PCT Filed: Feb. 19, 2020

(86) PCT No.: PCT/CN2020/075903
§ 371 (c)(1),
(2) Date: Aug. 17, 2022

(87) PCT Pub. No.: WO2021/163936
PCT Pub. Date: Aug. 26, 2021

(65) Prior Publication Data
US 2023/0103557 A1     Apr. 6, 2023

(51) Int. Cl.
*H04L 5/00* (2006.01)
*H04B 7/08* (2006.01)
*H04W 72/12* (2023.01)
*H04W 72/23* (2023.01)
*H04W 80/02* (2009.01)

(52) U.S. Cl.
CPC ........... *H04L 5/0053* (2013.01); *H04B 7/088* (2013.01); *H04W 72/12* (2013.01); *H04W 72/23* (2023.01); *H04W 80/02* (2013.01)

(58) Field of Classification Search
CPC ..... H04B 7/0695; H04B 7/088; H04L 5/0023; H04L 5/0091; H04L 5/0092; H04W 72/046; H04W 72/23–232
See application file for complete search history.

(56) References Cited

U.S. PATENT DOCUMENTS

| | | | | |
|---|---|---|---|---|
| 2020/0351039 A1* | 11/2020 | Zhou | | H04L 5/0023 |
| 2021/0184738 A1* | 6/2021 | Bai | | H04L 5/0048 |
| 2021/0185647 A1* | 6/2021 | Rahman | | H04L 41/0806 |
| 2022/0225370 A1* | 7/2022 | Park | | H04L 5/0044 |
| 2022/0312456 A1* | 9/2022 | Guo | | H04L 1/1822 |

(Continued)

FOREIGN PATENT DOCUMENTS

| | | |
|---|---|---|
| CN | 110809321 A | 2/2020 |
| WO | WO 2019143900 A1 | 7/2019 |
| WO | WO 2020029725 A1 | 2/2020 |

OTHER PUBLICATIONS

European Patent Application No. 20920490.8, Search and Opinion dated Jan. 5, 2023, 9 pages.

(Continued)

*Primary Examiner* — Pao Sinkantarakorn
(74) *Attorney, Agent, or Firm* — Cozen O'Connor

(57) ABSTRACT
A communication processing method, applied to a network device, includes: indicating transmission configuration indication (TCI) states of a plurality of channels to a user equipment (UE) using a set of TCI state indication signalings.

14 Claims, 5 Drawing Sheets receiving a set of TCI state indication signalings — S21 determining TCI states of a plurality of channels based on the set of TCI state indication signalings — S22

(56) References Cited

U.S. PATENT DOCUMENTS

2023/0025072 A1 *  1/2023 Yuan ................... H04W 72/231
2023/0327269 A1    10/2023 Yu et al.

OTHER PUBLICATIONS

Indian Patent Application No. 202247051132, Office Action dated
Mar. 6, 2023, 6 pages.
PCT/CN2020/075903 International Search Report dated Nov. 25,
2020; 2 pages.
Mediatek Inc. "Remaining Details on Bandwidth Part Operation in
NT" 3GPP TSG RAN WG1 Meeting #93, R1-1806775, May 2018,
11 pages.
European Patent Application No. 20920490.8, Office Action dated
Aug. 7, 2025, 11 pages.

* cited by examiner indicating TCI states of a plurality of channels for UE using a
set of TCI state indication signalings                    S11 receiving a set of TCI state indication signalings          S21 determining TCI states of a plurality of channels based on the set
of TCI state indication signalings                          S22

METHOD FOR INDICATING OR DETERMINING TRANSMISSION CONFIGURATION INDICATION STATES, AND DEVICE, AND COMPUTER STORAGE MEDIUM

CROSS-REFERENCE TO RELATED APPLICATION

This application is a national phase of International Application No. PCT/CN2020/075903, filed on Feb. 19, 2020, the entire content of which is incorporated herein by reference.

TECHNICAL FIELD

The disclosure relates to the field of communication technologies, and in particular, to a communication processing method, a communication processing device, and a computer storage medium.

BACKGROUND

In a $5^{th}$ generation mobile communication technology ($5^{th}$ generation mobile network or $5^{th}$ generation wireless system, 5G) new radio (NR) system, especially when a communication frequency band is above 6 GHz, it is necessary to use beam-based transmission and reception to ensure the coverage due to the faster attenuation of high-frequency channels.

SUMMARY

According to a first aspect of embodiments of the disclosure, a communication processing method is provided. The method is applied to a network device. The method includes: indicating transmission configuration indication (TCI) states of a plurality of channels to user equipment (UE) using a set of TCI state indication signalings.

According to a second aspect of embodiments of the disclosure, a communication processing method is provided. The method is applied to a UE. The method includes: receiving a set of TCI state indication signalings; and determining TCI states of a plurality of channels based on the set of TCI state indication signalings.

According to a third aspect of embodiments of the disclosure, a communication processing device is provided. The device includes: a processor; and a memory for storing executable instructions. The processor is configured to perform any communication processing method applied to the network device such as a base station as described above when executing the executable instructions.

According to a fourth aspect of embodiments of the disclosure, a communication processing device is provided. The device includes: a processor; and a memory for storing executable instructions. The processor is configured to perform any communication processing method applied to the UE as described above when executing the executable instructions.

According to a fifth aspect of embodiments of the disclosure, a non-transitory computer storage medium is provided. The computer storage medium has stored therein executable instructions. When the executable instructions are executed by a processor, the processor is caused to perform any communication processing method applied to the network device such as a base station as described above.

According to a sixth aspect of embodiments of the disclosure, a computer storage medium is provided. The computer storage medium has stored therein executable instructions. When the executable instructions are executed by a processor, the processor is caused to perform any communication processing method applied to the UE as described above.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with embodiments of the disclosure. Instead, they are merely examples of apparatuses and methods consistent with aspects related to embodiments of the disclosure as recited in the appended claims.

Terms used in embodiments of the disclosure are merely for describing specific examples and are not intended to limit embodiments of the disclosure. The singular forms "one", "the", and "this" used in embodiments of the disclosure and the appended claims are also intended to include a multiple form, unless other meanings are clearly represented in the context. It should also be understood that the term "and/or" used in the disclosure refers to any or all of possible combinations including one or more associated listed items.

It should be understood that although terms "first", "second", "third", and the like are used in embodiments of the disclosure to describe various information, the information is not limited to the terms. These terms are merely used to differentiate information of a same type. For example, without departing from the scope of disclosure of the disclosure, first information is also referred to as second information, and similarly the second information is also referred to as the first information. Depending on the context, for example, the term "if" used herein may be explained as "when" or "while", or "in response to . . . , it is determined that".

Figure 1:
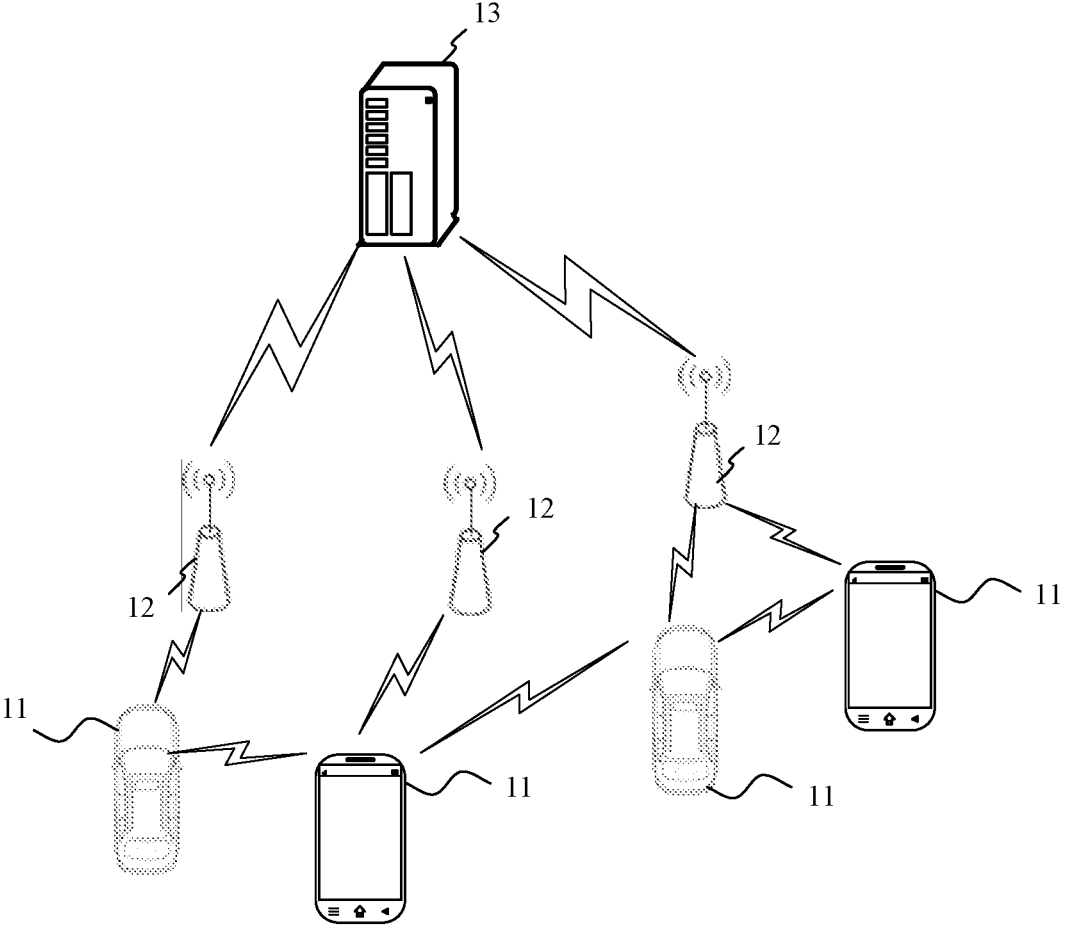
FIG. 1 is a schematic diagram illustrating a wireless communication system according to some embodiments.

With reference to FIG. 1, FIG. 1 illustrates a schematic diagram of a wireless communication system according to some embodiments of the disclosure. As illustrated in FIG. 1, the wireless communication system is a communication system based on cellular mobile communication technologies. The wireless communication system may include terminals 11 and base stations 12.

The terminal 11 may be a device that provides voice and/or data connectivity to a user. The terminal 11 can communicate with one or more core networks via a radio access network (RAN). The terminal 11 can be an IoT terminal such as a sensor device, a mobile phone (or a cellular phone) and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be an in-vehicle device, for example, a trip computer having a wireless communication function, or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the 4$^{th}$ generation mobile communication (4G) system, also known as the long term evolution (LTE) system. The wireless communication system may also be the 5$^{th}$ generation mobile communication (5G) system, also known as the new radio (NR) system or 5G NR system. Alternatively, the wireless communication system may also be a next-generation system of the 5G system. The access network in the 5G system can be called the new generation-radio access network (NG-RAN). The wireless communication system may also be a machine-type communication (MTC) system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized distributed architecture, it usually includes a central unit (CU) and at least two distributed units (DUs). The CU is provided with a packet data convergence protocol (PDCP) layer, a radio link control (RLC) layer and a protocol stack having a media access control (MAC) layer. The DU is provided with a protocol stack having a physical (PHY) layer. The embodiment of the disclosure does not limit the specific implementation manner of the base station 12.

A wireless link can be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is a NR. The wireless air interface can also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the disclosure.

In the NR system, especially when the communication frequency band is above 6 GHz, it is necessary to use beam-based transmission and reception to ensure the coverage due to the faster attenuation of high-frequency channels.

In the related art, the base station needs to use signalings such as a radio resource control (RRC) signaling and a medium access control (MAC) signaling respectively for a physical downlink control channel (PDCCH), a physical downlink shared channel (PDSCH), a physical uplink control channel (PUCCH), and a physical uplink shared channel (PUSCH), to indicate their transmission configuration indication (TCI) states. A reference signal index indicated in the TCI state corresponds to a beam direction, so that the process is complicated and the signaling overhead is relatively large.

In the related art, for the indication of the downlink beam, the base station indicates the TCI state of type D through the signaling, so as to inform the UE of the beam that needs to be used for reception. Each TCI state corresponds to a reference signal (RS) ID. The RS can be a non-zero power channel state information-reference signal resource (NZP CSI-RS), a synchronization signal block (SSB) or a sounding reference signal (SRS). For the beam-based transmission, the base station indicates spatial relation information through the signaling, so as to inform the UE of the beam that needs to be used for transmission. Each spatial relation information also corresponds to an RS, which can be an SRS, a NZP CSI-RS or a SSB.

The specific process is as follows.

For a reception process of a PDCCH: the base station uses a RRC signaling to indicate TCI states of a plurality of PDCCHs (for example, up to 64 or 128), and uses a MAC signaling to activate one in the RRC signaling for the UE to receive the PDCCH.

For a reception process of a PDSCH: the base station uses a RRC signaling to indicate TCI states of a plurality of PDSCHs (for example, up to 64 or 128), and uses a MAC signaling to activate multiple (such as 8, when the number in the RRC signaling is less than 8, no MAC signaling is required) in the RRC signaling, and use a DCI signaling to indicate one of TCI states activated by the MAC signaling, which is used by the UE to receive the PDSCH.

For a transmission process of a PUCCH: the base station uses a RRC signaling to indicate spatial relation information states of a plurality of PUCCHs (for example, up to 8 or 64 or 128), and uses a MAC signaling to activate one in the RRC signaling for the UE to transmit the PUCCH.

For a transmission process of a PUSCH: the base station uses a RRC signaling to indicate spatial relation information states of a plurality of PUSCHs (such as 8 or 64 or 128 at most), and uses a MAC signaling to activate multiple (such as 8, when the number in the RRC signaling is less than 8, no MAC signaling is required) in the RRC signaling; and uses a DCI signaling to indicate one spatial relation information state (i.e., a SRS resource indicator) in the multiple spatial relation information states (which are activated by the MAC) for the UE to transmit PUSCH. Since the spatial relation information states configured by the RRC is less, the number of bits of the DCI signaling is determined by the number of SRSs configured by the RRC, for example, log 2 (number of SRS) is rounded down to obtain the number of bits of the DCI signaling.

When the TCI state identifier of type D is given in the signaling, the UE is instructed to receive the PDCCH or PDSCH by the best reception beam (Rx beam) used when receiving the RS corresponding to the TCI state identifier or the reception beam corresponding to the transmission beam. When the spatial relation information is given in the signaling, it indicates the transmission beam used when the UE transmits the PUCCH or PUSCH: that is, the transmission beam with the best performance when transmitting or receiving the RS or the transmission beam corresponding to the reception beam, is used to transmit the PUCCH or PUSCH.

The problem in the related art is that for the PDCCH, the PDSCH, the PUCCH, and the PUSCH, the base station needs four sets of signalings to indicate the beam directions respectively, and the signaling overhead is relatively large.

Based on the above-mentioned wireless communication system, various embodiments of the method of the disclosure are proposed to simplify the communication process and save the signaling overhead.

Figures 2, 3:
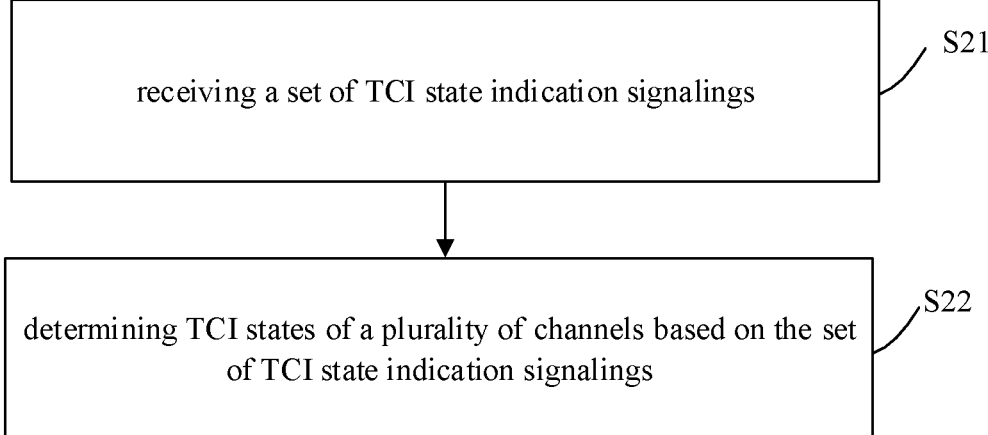
FIG. 2 is a first flowchart illustrating a communication processing method according to some embodiments.
FIG. 3 is a second flowchart illustrating a communication processing method according to some embodiments.

FIG. 2 is a first flowchart illustrating a communication processing method according to some embodiments. As illustrated in FIG. 2, the communication processing method is applied to a network device such as a base station. The method includes the following.

In S11, TCI states of a plurality of channels are indicated to UE using a set of TCI state indication signalings.

In embodiments of the disclosure, the TCI state indicates a reference signal identifier, and the reference signal identifier corresponds to a beam direction. The TCI state also refers to spatial relation information (spatial relation info), the spatial relation information also indicates a reference signal identifier, and the reference signal identifier also corresponds to a beam direction.

In embodiments of the disclosure, the plurality of channels include a combination of two or more of: a PDCCH, a PDSCH, a PUCCH, and a PUSCH.

In embodiments of the disclosure, the set of TCI state indication signalings at least includes a RRC signaling and a MAC signaling; the RRC signaling is configured to indicate information of a set of TCI states, the information of the set of TCI states includes M TCI states, and M is a positive integer; and the MAC signaling is configured to activate N TCI states in the TCI state set in the RRC signaling, N is a positive integer, and N is less than M.

Exemplarily, the set of TCI state indication signalings includes the RRC signaling and the MAC signaling. The set of TCI state indication signalings can be used to indicate the TCI state of the PDCCH and the TCI state of the PUCCH.

The technical solutions described in embodiments of the disclosure use one set of TCI state indication signalings to indicate the TCI states of the plurality of channels to the UE. In this way, compared to using the plurality of sets of TCI state indication signalings for the plurality of channels, it not only simplifies the communication process, but also can save the signaling overhead.

In some embodiments, the set of TCI state indication signalings includes the RRC signaling and the MAC signaling; the RRC signaling is configured to indicate information of a set of TCI states, the information of the set of TCI states includes M TCI states, and M is a positive integer; the MAC signaling is configured to activate N TCI states in the set of TCI states in the RRC signaling, N is a positive integer, and N is less than M. The set of TCI state indication signalings further includes a first DCI signaling; the first DCI signaling is configured to indicate one TCI state in the N TCI states activated by the MAC signaling, and the one TCI state is configured to indicate a reception beam of a PDSCH and/or a transmission beam of a PUSCH.

As an implementation manner, TCI state indication fields in different DCI signalings are configured to indicate the reception beam of the PDSCH and the transmission beam of the PUSCH, respectively.

As another implementation manner, a TCI state indication field in a same DCI signaling is configured to indicate the reception beam of the PDSCH and the transmission beam of the PUSCH, and the DCI signaling is a DCI signaling of scheduling the PDSCH and/or the PUSCH.

In practical applications, a number of bits occupied by a TCI state indication field in the DCI signaling for downlink scheduling is greater than or equal to a number of bits occupied by a TCI state indication field in the DCI signaling for uplink scheduling.

Exemplarily, the set of TCI state indication signalings includes the RRC signaling, the MAC signaling, and the DCI signaling. The set of TCI state indication signalings can be used to indicate the TCI state of the PDCCH, the TCI state of the PUCCH, the TCI state of the PDSCH, and the TCI state of PUSCH. The MAC signaling may activate more than one TCI state. Therefore, for the PDSCH or the PUSCH, the DCI signaling is required to indicate one TCI state in the TCI states activated by the MAC signaling. The one TCI state is configured to indicate the reception beam of the PDSCH and/or the transmission beam of the PUSCH. For the PDCCH or the PUCCH, one of the TCI states activated by the MAC signaling can be configured to indicate the beam of the PDCCH and/or the beam of PUCCH. For example, in the TCI states activated by the MAC signaling, a smallest TCI state index, or a largest TCI state index, or a control-channel TCI state indication field added to the MAC signaling, is configured to indicate that one of the TCI states activated by the MAC signaling is configured for the beam of the control channel.

Exemplarily, the set of TCI state indication signalings includes the RRC signaling, the MAC signaling, and the DCI signaling. The set of TCI state indication signalings can be used to indicate the TCI state of the PDCCH, the TCI state of the PUCCH, the TCI state of the PDSCH, and the TCI state of PUSCH. The RRC signaling configures M TCI states. The MAC signaling activates N TCI states. The MAC signaling also includes a mapping relationship. The mapping relationship is a relationship between second TCI state indexes and second TCI states. The second TCI state includes one TCI state or a combination of TCI states. The combination of TCI states includes a plurality of TCI states. For the PDSCH or the PUSCH, the DCI signaling is required to indicate one of the second TCI state indexes in the mapping relationship in the MAC signaling, thereby indicating that one TCI state or the combination of TCI states included in the second TCI states, corresponding to the index, is configured to indicate the reception beam of the PDSCH and/or the transmission beam of the PUSCH. For the PDCCH or the PUCCH, a fourth TCI state corresponding to one of the second TCI state indexes in the mapping relationship in the MAC signaling is configured to indicate the beam of the PDCCH and/or the beam of the PUCCH. For example, in the mapping relationship of the MAC signaling, one TCI state or the combination of TCI states corresponding to the index with the smallest second TCI state index number is configured for the beam of the control channel; or if the control channel also uses the plurality of TCI states, in one or more indexes of the combination of TCI states in the mapping relationship in the MAC signaling, the plurality of states in the combination of TCI states corresponding to the second TCI state index with the smallest index number are configured for the beam of the control channel.

The technical solutions described in embodiments of the disclosure use one set of TCI state indication signalings, which includes the RRC signaling, the MAC signaling, and the DCI signaling, to indicate the TCI state of the plurality of channels to the UE. In this way, compared to using the plurality of sets of TCI state indication signalings for the plurality of channels, it not only simplifies the communication process, but also saves the signaling overhead.

In the above solution, each TCI state corresponds to a reference signal identifier. A third TCI state in the N TCI states activated by the MAC signaling is configured to indicate the beam of the control channel. The third TCI state includes one TCI state.

The reference signal may be SRS, or SSB, or NZP CSI-RS, etc. In addition, the downlink reference signal can be configured to indicate the downlink reception beam/uplink transmission beam; similarly, the uplink reference signal can also be configured to indicate the uplink transmission beam/downlink reception beam.

As an implementation manner, the third TCI state includes one TCI state, and the third TCI state includes a TCI state with the smallest TCI state number in the N TCI states.

As another implementation manner, the third TCI state includes one TCI state, and the third TCI state includes a TCI state with the largest TCI state number in the N TCI states.

As yet another implementation manner, the third TCI state includes one TCI state, the MAC signaling further includes first indication information, and the first indication information is configured to indicate the third TCI state. The third TCI state includes one of the N TCI states.

Exemplarily, if the PDCCH, the PDSCH, the PUCCH and the PUSCH all use one beam direction at the same time, for example, the beam direction corresponding to the TCI state with the smallest TCI state ID, which is activated by the MAC signaling, is configured for the control channel, for another example, the beam direction corresponding to the TCI state with the largest TCI state ID, which is activated by the MAC signaling is configured for the control channel, for yet another example, the MAC signaling further indicates which TCI state of the plurality of activated TCI states is configured for the control channel, and all of the TCI states activated by the MAC signaling are configured for the data channel and the DCI signaling is further required to select one TCI state for the data channel. For example, the set of TCI states given by the RRC signaling includes TCI #0, TCI #1, TCI #2 . . . TCI #63, in which a total of 64 TCI states; the TCI states activated by the MAC signaling are TCI #3, TCI #4, TCI #5, TCI #6, TCI #15, TCI #16, TCI #18, TCI #63; then the smallest TCI state ID is TCI #3, and TCI #3 is configured for the control channel; or the largest TCI state ID is TCI #63, and TCI #63 is configured for the control channel; or, X (for example, 3) bits in the MAC signaling are configured to indicate which TCI state of the 8 activated TCI states is configured for the control channel. That is, TCI #3, TCI #4, TCI #5, TCI #6, TCI #15, TCI #16, TCI #18, TCI #63 may be reordered into new TCI #0, new TCI #1, new TCI #2, new TCI #3, new TCI #4, new TCI #5, new TCI #6, new TCI #7, then the 3 bits in the MAC signaling correspond to the new TCI state number, which is configured to indicate that the original TCI state corresponding to the new TCI state number is configured for the control channel. Further, if the DCI uses 3 bits to indicate which TCI state is configured for the data channel, the same indication manner is used as follows: "000" indicates that the new TCI #0 corresponds to the original TCI #3, "001" indicates that the new TCI #1 corresponds to the original TCI #4, "010" indicates that the new TCI #2 corresponds to the original TCI #5, "011" indicates that the new TCI #3 corresponds to the original TCI #6, "100" indicates that the new TCI #4 corresponds to the original TCI #15, "101" indicates the new TCI #5 corresponds to the original TCI #16, "110" indicates that the new TCI #6 corresponds to the original TCI #18, and "111" indicates that the new TCI #7 corresponds to the original TCI #63.

In some embodiments, the MAC signaling activates the N TCI states in the set of TCI states in the RRC signaling. The MAC signaling also includes indication information of a mapping relationship, and the mapping relationship is a mapping relationship between second TCI state indexes and second TCI states in the N TCI states, and the second TCI state includes one TCI state or a combination of TCI states, and the combination of TCI states include at least two TCI states. In an implementation manner, the set of TCI state indication signalings further includes a second DCI signaling; the second DCI signaling is configured to indicate a second TCI state index in the mapping relationship indicated by the MAC signaling, and a second TCI state corresponding to the second TCI state index is configured to indicate the reception beam of the PDSCH and/or the transmission beam of the PUSCH.

A fourth TCI state corresponding to a second TCI state index in the mapping relationship indicated by the MAC signaling is configured to indicate the beam of the control channel, in which the fourth TCI state includes one TCI state or a combination of TCI states, and the combination of TCI states include at least two TCI states. As an implementation manner, the second TCI state index includes a second TCI state index with the smallest index number. As another implementation manner, the second TCI state index includes a second TCI state index with the smallest index number in one or more indexes corresponding to the combination of TCI states.

Exemplarily, the mapping relationship is indicated in the form of a mapping table. If each of the PDCCH, the PDSCH, the PUCCH, and the PUSCH can use one or more beam directions at the same time, the MAC signaling further indicates a mapping table between second TCI state indexes and TCI states or combinations of TCI states. If the set of TCI states given by the RRC signaling includes TCI #0, TCI #1, TCI #2 . . . TCI #63, a total of 64 TCI states; and TCI states activated by the MAC signaling are TCI #3, TCI #4, TCI #5, TCI #6, TCI #15, TCI #16, TCI #18, TCI #63; then TCI #3, TCI #4, TCI #5, TCI #6, TCI #15, TCI #16, TCI #18, TCI #63 are reordered as the new TCI #0 corresponds to the original TCI #3, the new TCI #1 corresponds to the original TCI #4, the new TCI #2 corresponds to the original TCI #5, the new TCI #3 corresponds to the original TCI #6, and the new TCI #4 corresponds to the original TCI #15, the new TCI #5 corresponds to the original TCI #16, the new TCI #6 corresponds to the original TCI #18, and the new TCI #7 corresponds to the original TCI #63; the MAC signaling gives the mapping table as the mapping relationship between second TCI state indexes and the TCI states or combinations of TCI states is shown in Table 1. Then, the TCI state or combination of TCI states corresponding to the second TCI state index with the smallest index number in the second TCI state indexes in the mapping table is the TCI state or combination of TCI states for the control channel. For example, the TCI state corresponding to the second TCI state index of "000", that is, the new TCI #0, that is, the original TCI #3, is the TCI state of the control channel; or in one or more indexes corresponding to the combination of TCI states, the combination of TCI states corresponding the second TCI state index with the smallest index number is for the control channel, for example, the combination of TCI states corresponding to "100" includes the new TCI # and the new TCI #4, that is, the original TCI #3 and the original TCI #15, which are for the control channel. Or, as described above, the MAC signaling uses 3 bits to indicate the second TCI state index in the first column of Table 1, thereby indicating the TCI state or combination of TCI states used for the control channel.

TABLE 1

| second TCI state index | new TCI state or combination | original TCI state or combination |
|---|---|---|
| 000 | new TCI#0 | original TCI#3 |
| 001 | new TCI#4 | original TCI#15 |
| 010 | new TCI#1 | original TCI#4 |
| 011 | new TCI#5 | original TCI#16 |
| 100 | new TCI#0 & new TCI#4 | original TCI#3 & original TCI#15 |
| 101 | new TCI#1 & new TCI#5 | original TCI#4 & original TCI#16 |
| 110 | new TCI#2 & new TCI#6 | original TCI#5 & original TCI#18 |
| 111 | new TCI#3 & new TCI#7 | original TCI#6 & original TCI#63 |

In some embodiments, the plurality of channels are PDCCHs and PDSCHs, and the PDSCHs are PDSCHs scheduled by the PDCCHs.

In some embodiments, the plurality of channels are PDCCHs and PUSCHs, and the PUSCHs are PUSCHs scheduled by the PDCCH.

In some embodiments, the plurality of channels are PDCCHs and PUCCHs, and the PUCCHs are PUCCHs scheduled by the PDCCHs or the PUCCHs are PUCCHs having a preset time relationship with the PDCCHs.

In some embodiments, the PDSCH and the PUSCH can be represented by the same TCI state, where the transmission time of the PUSCH and the PDSCH meets a preset time relationship; for example, the preset time relationship includes: a time interval of the transmission time of the PUSCH and the transmission time of the PDSCH is less than one or L time slots, and L is a positive integer greater than or equal to 2; or, the transmission time of the PDSCH and the transmission time of the PUSCH are in the same time slot.

In some embodiments, the set of TCI state indication signalings includes a plurality of signaling; indicating the TCI states of the plurality of channels to the UE using the set of TCI state indication signalings includes: at least one signaling in the set of TCI state indication signalings for indicating the TCI states of the plurality of channels is shared.

In this way, when the TCI states of the plurality of channels are indicated, at least one signaling transmitted to the UE is shared. In this way, the signaling overhead can be saved.

In some embodiments, the plurality of channels are channels on one component carrier (CC) or one BWP.

Exemplarily, channels on one CC or one BWP include one of the following: the PDCCH and the PDSCH on one CC; the PUCCH and the PUSCH on one CC; the PDCCH and the PUCCH on one CC; the PDCCH and the PUSCH on one CC; the PDSCH and the PUSCH on one CC; the PDCCH, the PDSCH, the PUCCH and the PUSCH on one CC; the PDCCH and the PDSCH on one BWP; the PUCCH and the PUSCH on one BWP; the PDCCH and the PUCCH on one BWP; the PDCCH and the PUSCH on one BWP; the PDSCH and the PUSCH on one BWP; or the PDCCH, the PDSCH, the PUCCH and the PUSCH on one BWP.

In some embodiments, the plurality of channels are channels on a plurality of CC or a plurality of BWP.

Exemplarily, channels on the plurality of CC or the plurality of BWP include one of the following: the PDCCHs on the plurality of CCs; the PUCCHs on the plurality of CCs; the PDSCHs on the plurality of CCs; the PUSCHs on the plurality of CCs; the PDCCHs and the PDSCHs on the plurality of CCs; the PUCCHs and the PUSCHs on the plurality of CCs; the PDCCHs and the PUCCHs on the plurality of CCs; the PDCCHs and the PUSCHs on the plurality of CCs; the PDSCHs and the PUSCHs on the plurality of CCs; the PDCCHs, the PDSCHs, the PUCCHs and the PUSCHs on the plurality of CCs; the PDCCHs on the plurality of BWPs; the PUCCHs on the plurality of BWPs; the PDSCHs on the plurality of BWPs; the PUSCHs on the plurality of BWPs; the PDCCHs and the PDSCHs on the plurality of BWPs; the PUCCHs and the PUSCHs on the plurality of BWPs; the PDCCHs and the PUCCHs on the plurality of BWPs; the PDCCHs and the PUSCHs on the plurality of BWPs; the PDSCHs and the PUSCHs on the plurality of BWPs; and the PDCCHs, the PDSCHs, the PUCCHs and the PUSCHs on the plurality of CCs.

It should be noted that the plurality of channels include channels established between the UE and a serving cell, and channels established between the UE and a neighboring cell.

It should be noted that the downlink transmission configuration indication may be referred to as TCI, and the uplink transmission configuration indication may be referred to as spatial relation info. Or in order to unify uplink and downlink, both the uplink transmission configuration indication and the downlink transmission configuration indication can be referred to as TCI, or the downlink transmission configuration indication can be TCI, and the uplink transmission configuration indication can be UL-TCI. That is, the TCI state in the disclosure can indicate the beam direction corresponding to the downlink transmission configuration, and can also indicate the beam direction corresponding to the uplink transmission configuration or spatial relation info.

FIG. 3 is a second flowchart illustrating a communication processing method according to some embodiments. As illustrated in FIG. 3, the communication processing method is applied to UE and includes the following.

In S21, a set of TCI state indication signalings is received.

In S22, TCI states of a plurality of channels are determined based on the set of TCI state indication signalings.

In embodiments of the disclosure, the TCI state indicates a reference signal identifier, and the reference signal identifier corresponds to a beam direction. The TCI state also refers to spatial relation information (spatial relation info), the spatial relation information also indicates a reference signal identifier, and the reference signal identifier also corresponds to a beam direction.

In embodiments of the disclosure, the plurality of channels include a combination of two or more of: a PDCCH, a PDSCH, a PUCCH, and a PUSCH.

In embodiments of the disclosure, the set of TCI state indication signalings at least includes a RRC signaling and a MAC signaling; the RRC signaling is configured to indicate information of a set of TCI states, the information of the set of TCI states includes M TCI states, and M is a positive integer; and the MAC signaling is configured to activate N TCI states in the TCI state set in the RRC signaling, N is a positive integer, and N is less than M.

Exemplarily, the set of TCI state indication signalings includes the RRC signaling and the MAC signaling. The set of TCI state indication signalings can be used to determine the TCI state of the PDCCH and the TCI state of the PUCCH indicated by the network device.

According to the technical solutions described in embodiments of the disclosure, the UE determines the TCI states of the plurality of channels based on one set of TCI state indication signalings. Thus, compared to determining the TCI states of the plurality of channels through the plurality of sets of TCI state indication signalings, it not only simplifies the communication process, but also can save the signaling overhead.

In some embodiments, the set of TCI state indication signalings includes the RRC signaling, the MAC signaling, and the DCI signaling. The set of TCI state indication signalings can be used to indicate the TCI state of the PDCCH, the TCI state of the PUCCH, the TCI state of the PDSCH, and the TCI state of PUSCH. The MAC signaling may activate more than one TCI state. Therefore, for the PDSCH or the PUSCH, the DCI signaling is required to indicate one TCI state in the TCI states activated by the MAC signaling. The one TCI state is configured to indicate the reception beam of the PDSCH and/or the transmission beam of the PUSCH. For the PDCCH or the PUCCH, one of the TCI states activated by the MAC signaling can be configured to indicate the beam of the PDCCH and/or beam of PUCCH. For example, in the TCI states activated by the MAC signaling, a smallest TCI state index, or a largest TCI state index, or a control-channel TCI state indication field added to the MAC signaling, is configured to indicate that one of the TCI states activated by the MAC signaling is configured for the beam of the control channel.

Exemplarily, the set of TCI state indication signalings includes the RRC signaling, the MAC signaling, and the DCI signaling. The set of TCI state indication signalings can be used to indicate the TCI state of the PDCCH, the TCI state of the PUCCH, the TCI state of the PDSCH, and the TCI state of PUSCH. The RRC signaling configures M TCI states. The MAC signaling activates N TCI states. The MAC signaling also includes a mapping relationship. The mapping relationship is a relationship between second TCI state indexes and second TCI states. The second TCI state includes one TCI state or a combination of TCI states. The combination of TCI states includes a plurality of TCI states. For the PDSCH or the PUSCH, the DCI signaling is required to indicate one of the second TCI state indexes in the mapping relationship in the MAC signaling, thereby indicating that one TCI state or the combination of TCI states included in the second TCI states, corresponding to the index, is configured to indicate the reception beam of the PDSCH and/or the transmission beam of the PUSCH. For the PDCCH or the PUCCH, a fourth TCI state corresponding to one of the second TCI state indexes in the mapping relationship in the MAC signaling is configured to indicate the beam of the PDCCH and/or the beam of the PUCCH. For example, in the mapping relationship of the MAC signaling, one TCI state or the combination of TCI states corresponding to the index with the smallest second TCI state index number is configured for the beam of the control channel; or if the control channel also uses the plurality of TCI states, in one or more indexes of the combination of TCI states in the mapping relationship in the MAC signaling, the plurality of states in the combination of TCI states corresponding to the second TCI state index with the smallest index number are configured for the beam of the control channel.

According to the technical solutions described in embodiments of the disclosure, the UE determines the TCI states of the plurality of channels based on one set of TCI state indication signalings. In this way, compared to determining the TCI states of the plurality of channels through the plurality of sets of TCI state indication signalings, it not only simplifies the communication process, but also saves the signaling overhead.

In the above solution, the method further includes: based on target beams corresponding to the TCI states, performing data transmission with a network device on the corresponding channels.

In this way, the communication process between the network device such as the base station and the UE can be saved, and the signaling overhead can also be saved.

Figure 4:
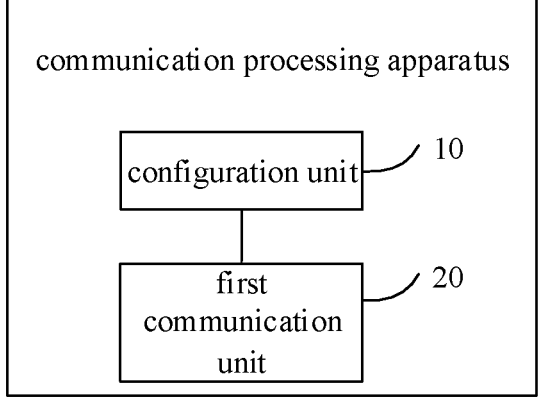
FIG. 4 is a first block diagram of a communication processing apparatus according to some embodiments.

FIG. 4 is a first block diagram of a communication processing apparatus according to some embodiments. The communication processing apparatus is applied to a network device such as a base station side. Referring to FIG. 4, the apparatus includes a configuration unit 10 and a first communication unit 20.

The configuration unit 10 is configured to configure a set of TCI state indication signalings.

The first communication unit 20 is configured to indicate TCI states of a plurality of channels to a user equipment (UE) using the set of TCI state indication signalings.

With respect to the apparatuses in the above embodiments, the specific manners for performing operations for individual modules therein have been described in detail in the embodiments regarding the methods, which will not be elaborated herein.

In practical applications, the specific structures of the configuration unit 10 and the first communication unit 20 can be configured by a central processing unit (CPU), a micro controller unit (MCU), a digital signal processor (DSP) or a programmable logic controller (PLC) and the like in the communication processing apparatus or the network device to which the communication processing apparatus belongs.

The communication processing apparatus described in some embodiments may be set on the side of the network device such as the base station.

Those skilled in the art should understand that the functions of the processing modules in the communication processing apparatus of embodiments of the disclosure can be understood by referring to the foregoing description of the communication processing method applied to the network device side such as the base station. Each processing module can be implemented by an analog circuit that implements the functions described in embodiments of the disclosure, or can be implemented by running software that implements the functions described in embodiments of the disclosure on the terminal.

The communication processing apparatus described in embodiments of the disclosure can simplify the communication process and save the signaling overhead.

Figure 5:
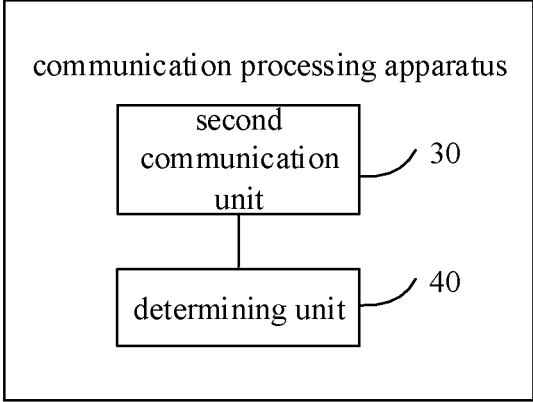
FIG. 5 is a second block diagram of a communication processing apparatus according to some embodiments.

FIG. 5 is a second block diagram of a communication processing apparatus according to some embodiments. The communication processing apparatus is applied to a UE side. Referring to FIG. 5, the apparatus includes a second communication unit 30 and a determining unit 40.

The second communication unit 30 is configured to receive a set of TCI state indication signalings.

The determining unit 40 is configured to determine TCI states of a plurality of channels based on the set of TCI state indication signalings.

The second communication unit 30 is also configured to, based on target beams corresponding to the TCI states, perform data transmission with a network device on the corresponding channels.

With respect to the apparatuses in the above embodiments, the specific manners for performing operations for individual modules therein have been described in detail in the embodiments regarding the methods, which will not be elaborated herein.

In practical applications, the specific structures of the second communication unit 30 and the determining unit 40 described above can be implemented by CPU, MCU, DSP, or PLC in the communication processing apparatus or the UE to which the communication processing apparatus belongs.

The communication processing apparatus described in some embodiments may be set on the UE side.

Those skilled in the art should understand that the functions of the processing modules in the communication processing apparatus of embodiments of the disclosure can be understood by referring to the foregoing description of the communication processing method applied to the base station side. Each processing module can be implemented by an analog circuit that implements the functions described in embodiments of the disclosure, or can be implemented by running software that implements the functions described in embodiments of the disclosure on the terminal.

The communication processing apparatus described in embodiments of the disclosure can simplify the communication process and save the signaling overhead.

Figure 6:
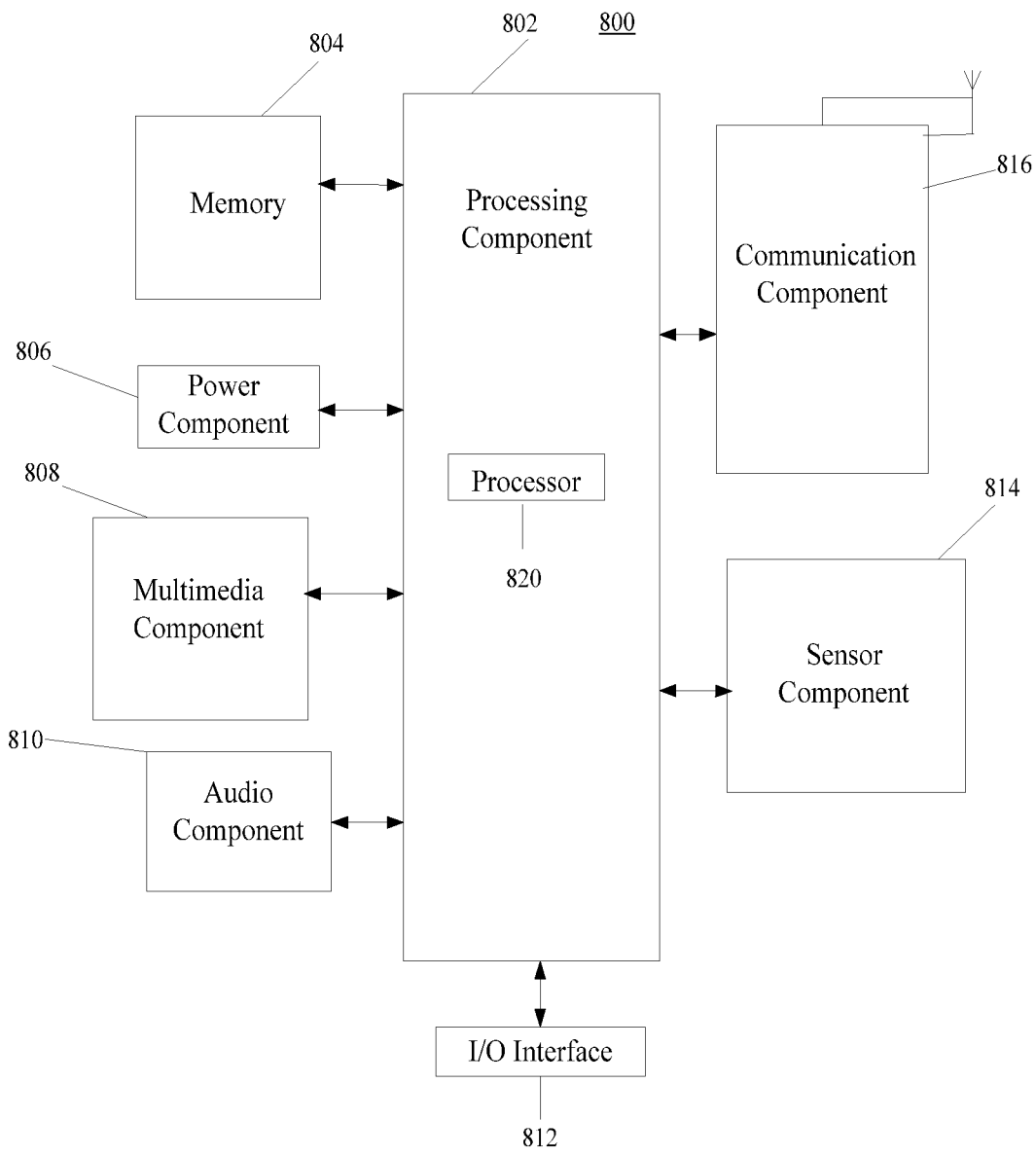
FIG. 6 is a block diagram of a device 800 for implementing communication processing according to some embodiments.

FIG. 6 is a block diagram of a device 800 for implementing communication processing according to some embodiments. For example, the device 800 may be a mobile phone, a computer, a digital broadcast terminal, a messaging device, a gaming console, a tablet, a medical device, exercise equipment, a personal digital assistant, and the like.

Referring to FIG. 6, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Figure 7:
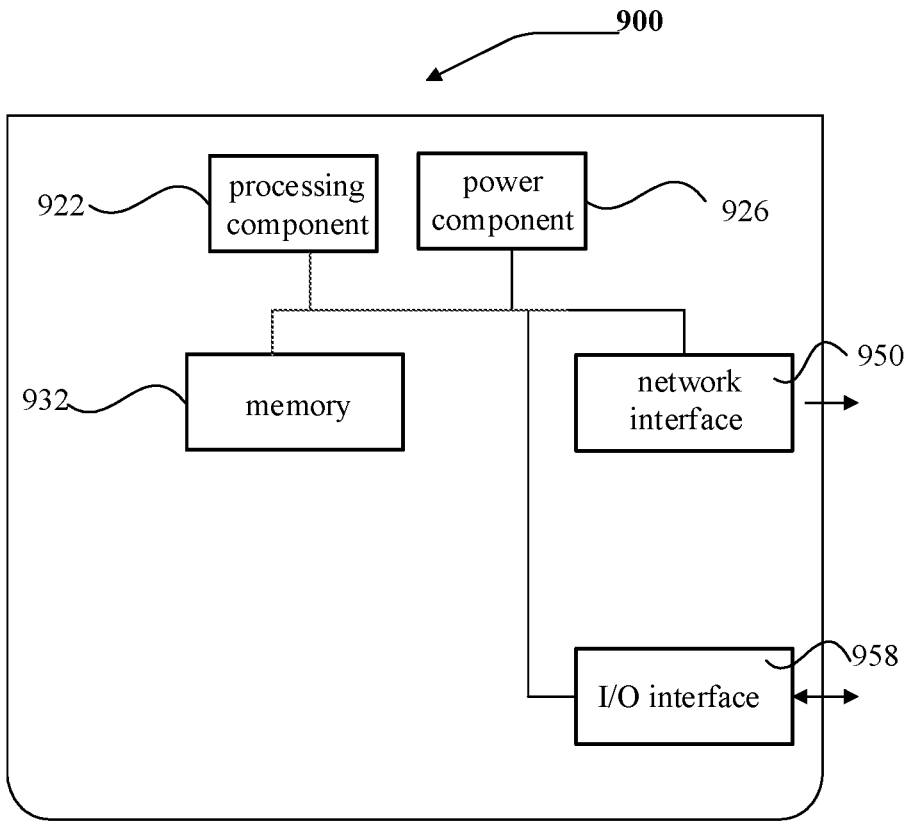
FIG. 7 is a block diagram of a device 900 for implementing communication processing according to some embodiments.

FIG. 7 is a block diagram of a device 900 for implementing communication processing according to some embodiments. For example, the device 900 may be a server. Referring to FIG. 7, the device 900 may include a processing component 922 (which further includes one or more processors), and a memory resource represented by a memory 932 for storing instructions such as applications that can be executed by the processing component 922. Applications stored in the memory 932 can include one or more modules of each corresponding to a set of instructions. In addition, the processing component 922 is configured to execute instructions to perform the above communication processing method applied to the network device such as the base station side.

The device 900 can also include a power component 926 configured to perform the power management of the device 900, a wired or wireless network interface 950 configured to connect the device 900 to the network, and an input/output (I/O) interface 958. The device 900 can operate operating systems based on the memory 932 such as Windows Server™, Mac OS X™, Unix™, Linux™, FreeBSD™ or similar.

The technical solutions recorded in embodiments may be arbitrarily combined without conflict.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for indicating transmission configuration indication (TCI) states, performed by a network device, comprising:
indicating TCI states of a plurality of channels to a user equipment (UE) using a set of TCI state indication signalings;
wherein the set of TCI state indication signalings comprises a radio resource control (RRC) signaling, a medium access control (MAC) signaling, and a first downlink control information (DCI) signaling;
the RRC signaling indicates information of a set of TCI states, the information of the set of TCI states comprises M TCI states, and M is a positive integer;
the MAC signaling activates N TCI states in the set of TCI states in the RRC signaling, N is a positive integer, and N is less than M; and
the first DCI signaling indicates one first TCI state in the N TCI states activated by the MAC signaling, the first TCI state indicates a reception beam of a physical downlink shared channel (PDSCH) and a transmission beam of a physical uplink shared channel (PUSCH);
wherein, a third TCI state in the N TCI states activated by the MAC signaling indicates a beam of a control channel, and the third TCI state comprises one TCI state with a smallest TCI state number or a largest TCI state number in the N TCI states;
wherein, the plurality of channels comprises physical downlink control channels (PDCCHs) and physical uplink control channels (PUCCHs), and the PUCCHs are PUCCHs having a preset time relationship with the PDCCHs.

2. The method as claimed in claim 1, wherein the plurality of channels comprises channels on one component carrier (CC) or one bandwidth part (BWP).

3. The method as claimed in claim 1, wherein the plurality of channels comprises channels on a plurality of component carriers (CCs) or a plurality of bandwidth parts (BWPs).

4. The method as claimed in claim 1, wherein TCI state indication fields in different DCI signalings indicate the reception beam of the PDSCH and the transmission beam of the PUSCH, respectively.

5. The method as claimed in claim 1, wherein a TCI state indication field in a same DCI signaling indicates the reception beam of the PDSCH and the transmission beam of the PUSCH, and the DCI signaling is a DCI signaling of scheduling the PDSCH and/or the PUSCH.

6. The method as claimed in claim 1, wherein the set of TCI state indication signalings comprises a plurality of signalings;
indicating the TCI states of the plurality of channels to the UE using the set of TCI state indication signalings comprises:

at least one signaling in the set of TCI state indication signalings for indicating the TCI states of the plurality of channels is shared.

7. A non-transitory computer storage medium having stored therein executable instructions that, when executed by a processor, causes the processor to perform the method for indicating transmission configuration indication (TCI) states as claimed in claim 1.

8. The method as claimed in claim 1, wherein the PDSCH and the PUSCH are represented by a same TCI state, and a transmission time of the PUSCH and a transmission time of the PDSCH meet a preset time relationship;

wherein the preset time relationship includes:

a time interval of the transmission time of the PUSCH and the transmission time of the PDSCH is less than one or L time slots, and L is a positive integer greater than or equal to 2; or the transmission time of the PDSCH and the transmission time of the PUSCH are in a same time slot.

9. A method for determining transmission configuration indication (TCI) states, performed by a user equipment (UE), comprising:

receiving a set of TCI state indication signalings; wherein the set of TCI state indication signalings comprises a radio resource control (RRC) signaling, a medium access control (MAC) signaling, and a first downlink control information (DCI) signaling; the RRC signaling indicates information of a set of TCI states, the information of the set of TCI states comprises M TCI states, and M is a positive integer; the MAC signaling activates N TCI states in the set of TCI states in the RRC signaling, N is a positive integer, and N is less than M; the first DCI signaling indicates one first TCI state in the N TCI states activated by the MAC signaling, the first TCI state indicates a reception beam of a physical downlink shared channel (PDSCH) and a transmission beam of a physical uplink shared channel (PUSCH); and determining TCI states of a plurality of channels based on the set of TCI state indication signalings;

wherein, a third TCI state in the N TCI states activated by the MAC signaling indicates a beam of a control channel, and the third TCI state comprises one TCI state with a smallest TCI state number or a largest TCI state number in the N TCI states;

wherein, the plurality of channels comprises physical downlink control channels (PDCCHs) and physical uplink control channels (PUCCHs), and the PUCCHs are PUCCHs having a preset time relationship with the PDCCHs.

10. The method as claimed in claim 9, further comprising:

based on target beams corresponding to the TCI states, performing data transmission with a network device on the corresponding channels.

11. A user equipment, comprising:

a processor; and a memory for storing executable instructions;

wherein the processor is configured to perform the method for determining transmission configuration indication (TCI) states as claimed in claim 9 when executing the executable instructions.

12. A non-transitory computer storage medium having stored therein executable instructions that, when executed by a processor, causes the processor to perform the method for determining transmission configuration indication (TCI) states as claimed in claim 9.

13. The method as claimed in claim 9, wherein the PDSCH and the PUSCH are represented by a same TCI state, and a transmission time of the PUSCH and a transmission time of the PDSCH meet a preset time relationship;

wherein the preset time relationship includes:

a time interval of the transmission time of the PUSCH and the transmission time of the PDSCH is less than one or L time slots, and L is a positive integer greater than or equal to 2; or the transmission time of the PDSCH and the transmission time of the PUSCH are in a same time slot.

14. A network device, comprising:

a processor; and a memory for storing executable instructions;

wherein the processor is configured to when executing the executable instructions:

indicate transmission configuration indication (TCI) states of a plurality of channels to a user equipment (UE) using a set of TCI state indication signalings;

wherein the set of TCI state indication signalings comprises a radio resource control (RRC) signaling, a medium access control (MAC) signaling, and a first downlink control information (DCI) signaling;

the RRC signaling indicates information of a set of TCI states, the information of the set of TCI states comprises M TCI states, and M is a positive integer;

the MAC signaling activates N TCI states in the set of TCI states in the RRC signaling, N is a positive integer, and N is less than M; and the first DCI signaling indicates one first TCI state in the N TCI states activated by the MAC signaling, the first TCI state indicates a reception beam of a physical downlink shared channel (PDSCH) and a transmission beam of a physical uplink shared channel (PUSCH);

wherein, a third TCI state in the N TCI states activated by the MAC signaling indicates a beam of a control channel, and the third TCI state comprises one TCI state with a smallest TCI state number or a largest TCI state number in the N TCI states;

wherein, the plurality of channels comprises physical downlink control channels (PDCCHs) and physical uplink control channels (PUCCHs), and the PUCCHs are PUCCHs having a preset time relationship with the PDCCHs.

\* \* \* \* \*